(12) United States Patent
Mikami et al.

(10) Patent No.: US 11,225,439 B2
(45) Date of Patent: Jan. 18, 2022

(54) CR:YAG SINTERED BODY AND PRODUCTION METHOD THEREOF

(71) Applicant: JX Nippon Mining & Metals Corporation, Tokyo (JP)

(72) Inventors: Makoto Mikami, Ibaraki (JP); Yoshiki Yamazaki, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 16/957,803

(22) PCT Filed: Oct. 28, 2019

(86) PCT No.: PCT/JP2019/042127
§ 371 (c)(1),
(2) Date: Aug. 20, 2020

(87) PCT Pub. No.: WO2020/166139
PCT Pub. Date: Aug. 20, 2020

(65) Prior Publication Data
US 2021/0221741 A1  Jul. 22, 2021

(30) Foreign Application Priority Data
Feb. 12, 2019  (JP) .............................. JP2019-022409

(51) Int. Cl.
*C04B 35/44* (2006.01)
*C04B 35/505* (2006.01)
(52) U.S. Cl.
CPC ........ *C04B 35/44* (2013.01); *C04B 2235/401* (2013.01); *C04B 2235/402* (2013.01); *C04B 2235/404* (2013.01); *C04B 2235/428* (2013.01); *C04B 2235/764* (2013.01)
(58) Field of Classification Search
CPC .............................. C04B 35/505; C04B 35/44
See application file for complete search history.

(56) References Cited

U.S. PATENT DOCUMENTS

| 6,200,918 B1 | 3/2001 | Yanagitani et al. |
| 7,253,129 B2 | 8/2007 | Takagimi et al. |

FOREIGN PATENT DOCUMENTS

| JP | H05-286761 A | 11/1993 |
| JP | H05-301770 A | 11/1993 |
| JP | H07-291799 A | 11/1995 |

(Continued)

OTHER PUBLICATIONS

Ikesue et al., "Transparent Cr4+-Doped YAG Ceramics for Tunable Lasers", Journal of the American Ceramic Society, vol. 79, No. 2, pp. 507-509, Feb. 1996.

(Continued)

*Primary Examiner* — Karl E Group
(74) *Attorney, Agent, or Firm* — Howson & Howson LLP

(57) ABSTRACT

A Cr:YAG sintered body including Al, Y, Cr, Ca, Mg, Si, and O, and component contents in the sintered body satisfying conditional expressions of 1) to 3) below, provided in the Conditional expression, each chemical symbol represents a component content (atppm).

$$|(Y+Ca)/(Al+Cr+Si+Mg)-0.6|<0.001; \qquad 1)$$

$$0 \leq (Ca+Mg)-(Cr+Si) \leq 50 \text{ atppm; and} \qquad 2)$$

$$50 \leq Si \leq 500 \text{ atppm} \qquad 3)$$

The embodiment of the present invention is to provide a Cr:YAG sintered body which exhibits high transparency and has a high $Cr^{4+}$ conversion ratio, and its production method.

4 Claims, 4 Drawing Sheets

(56) References Cited

FOREIGN PATENT DOCUMENTS

| JP | 2008-195570 A | 8/2008 |
|---|---|---|
| JP | 2009-084060 A | 4/2009 |
| JP | 2017-201662 A | 11/2017 |

OTHER PUBLICATIONS

Ikesue et al., "Fabrication and Optical Properties of High-Performance Polycrystalline Nd:YAG Ceramics for Solid-State Lasers", Journal of the American Ceramic Society, vol. 78, No. 4, pp. 1033-1040, Apr. 1995.
Ikesue et al., "Synthesis of Nd3+, Cr3+-codoped YAG Ceramics for High-Efficiency Solid-State Lasers", Journal of the American Ceramic Society, vol. 78, No. 9, pp. 2545-2547, Sep. 1995.
Zhou et al., "Effects of Sintering Aids on the Transparency and Conversion Efficiency of Cr4+ Ions in Cr: YAG Transparent Ceramics", Journal of the American Ceramic Society, vol. 98, No. 8, pp. 2459-2464, Apr. 2015.
Zhou et al., "Sintering Additives Regulated Cr Ion Charge State in Cr doped YAG Transparent Ceramics", Ceramics International, vol. 44, No. 12, pp. 13820-13826, Apr. 2018.
Extended European Search Report issued in corresponding European Patent Application No. EP 19870067.6 dated May 14, 2021.

CR:YAG SINTERED BODY AND PRODUCTION METHOD THEREOF

BACKGROUND

The present invention relates to a Cr:YAG (yttrium aluminum garnet) sintered body and its production method.

YAG (yttrium aluminum garnet) is a crystal of a garnet structure formed from a complex oxide of yttrium and aluminum ($Y_3Al_5O_{12}$). It has been known that the substituted element becomes the emission center and yields strong fluorescence by 1) forming the "Y element" configuring YAG into a substitutional solid solution by adding to YAG an element from Ce (atomic number 57) to Yb (atomic number 70) among rare earth elements, or 2) forming the "Al element" configuring YAG into a substitutional solid solution by adding to YAG an element from Ti (atomic number 22) to Ni (atomic number 28) among transition metals; and this is used to create a phosphor, a laser medium and the like.

As a commonly used material, there is Nd:YAG to which Nd (neodymium) is added, which oscillates laser at a wavelength of 1064 nm. Moreover, there is a combination of Nd:YAG and YAG to which tetravalent Cr atoms (hereinafter indicated as $Cr^{4+}$) are added. While this absorbs light having a wavelength of 1064 nm, by adjusting the Concentration and saturating the absorbable light quantity at a certain level (saturable absorber), in the beginning $Cr^{4+}$:YAG absorbs light, suppresses the laser oscillation of Nd:YAG and accumulates the amount of excitation; once $Cr^{4+}$:YAG can no longer absorb light, laser oscillation is generated at once from the excited state accumulated in Nd:YAG, whereby a strong pulsed laser beam is generated; and then the absorbing state in $Cr^{4+}$:YAG is mitigated, and $Cr^{4+}$:YAG returns to its initial state. With the process being repeated, a state referred to as passive Q-switching oscillation which periodically generates strong pulsed light can be generated.

Since laser based on the Combination of Nd:YAG and Cr:YAG automatically generates strong pulsed light as described above, it is applied to various uses as described in Patent Document 1. In recent years, polycrystalline YAG can be produced by the same molding/sintering method that is used for preparing general ceramics, in which pores (voids) existing at the grain boundary have been suppressed to the extent possible, and it is now known that this polycrystalline YAG exhibits excellent light transmission characteristics, albeit being slightly inferior to those of single crystals. Examples of the inventions related to a polycrystalline YAG sintered body are described in Patent Documents 2 and 3.

CITATION LIST

Patent Documents

[Patent Document 1] Japanese Patent Application Publication No. 2017-201662
[Patent Document 2] Japanese Patent No. 4237707
[Patent Document 3] Japanese Patent No. 5019380

SUMMARY

According to the embodiment of the invention, there is to provide a Cr:YAG sintered body which exhibits high transparency and has a high $Cr^{4+}$ conversion ratio, and its production method.

A Cr:YAG sintered body according to the embodiment of the present invention includes Al, Y, Cr, Ca, Mg, Si, and O, and component contents in the sintered body satisfy conditional expressions of 1) to 3) below. Note that, in the Conditional expressions, each chemical symbol represents a component content (atppm).

$$|(Y+Ca)/(Al+Cr+Si+Mg)-0.6|<0.001 \qquad 1)$$

$$0 \le (Ca+Mg)-(Cr+Si) \le 50 \text{ atppm} \qquad 2)$$

$$50 \le Si \le 500 \text{ atppm} \qquad 3)$$

According to the embodiment of the present invention, it is possible to produce a Cr:YAG sintered body which exhibits high transparency and has a high $Cr^{4+}$ conversion ratio.

DETAILED DESCRIPTION

Figure 1:
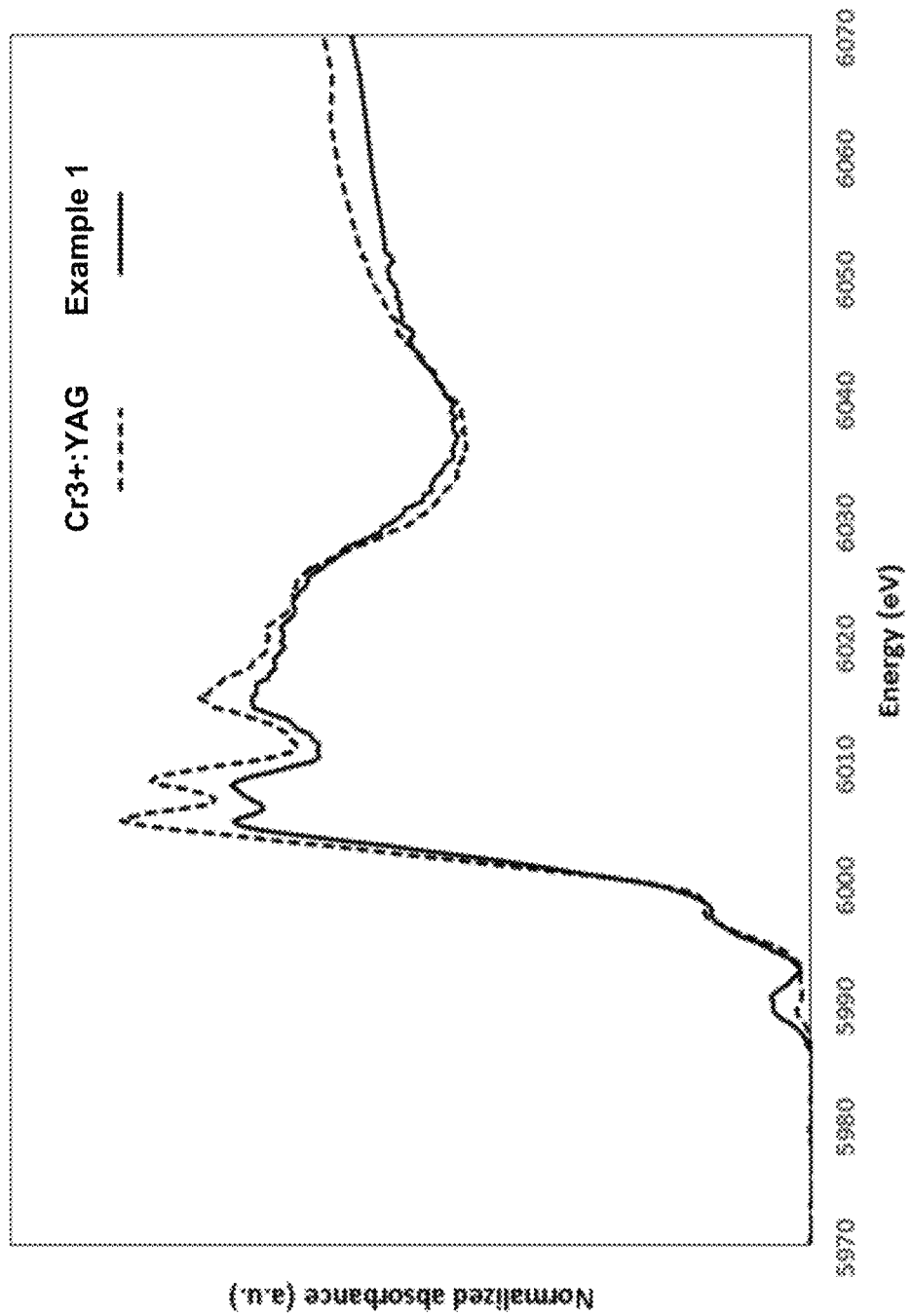
FIG. 1 is a diagram showing the XANES measurement results of the K absorption end of Example 1 and $Cr^{3+}$:YAG.

Cr atoms in Cr:YAG enter a site in YAG which is substituted with Al atoms, and the Cr atoms also tend to become trivalent (hereinafter indicated as $Cr^{3+}$) because Al is trivalent. When the Concentration of $Cr^{4+}$ is insufficient, passive Q-switching is less likely to occur, thus, it is desirable to increase the ratio of $Cr^{4+}$. In order to convert $Cr^{3+}$ into $Cr^{4+}$, considered may be adding bivalent atoms and substituting the trivalent Y atoms and the trivalent Al atoms with such bivalent atoms to compensate the valence. Nevertheless, this valence compensation cannot be entirely realized just because a bivalent element is used, and at the moment known are only Ca and Mg that can be used as such bivalent elements However, sufficient sinterability cannot be obtained merely by adding Ca or Mg to a YAG sintered body, because an increase in the additive amount will become a problem in that sinterability even deteriorates and transparency cannot be obtained. The present inventors examined Si among the various additive elements which particularly improve the sinterability, and found that Si, which is tetravalent, works to obstruct conversion into $Cr^{4+}$ when added, but by adjusting the amount appropriately, the sinterability will particularly improve without obstructing conversion into $Cr^{4+}$.

In light of the findings, according to the embodiment of the present invention, a Cr:YAG sintered body includes Al, Y, Cr, Ca, Mg, Si, and O, and component contents in the sintered body satisfy conditional expressions of 1) to 3) below. Note that each chemical symbol represents component content (atppm) in the Conditional expressions.

$$|(Y+Ca)/(Al+Cr+Si+Mg)-0.6|<0.001 \qquad 1)$$

$$0 \le (Ca+Mg)-(Cr+Si) \le 50 \text{ atppm} \qquad 2)$$

$$50 \le Si \le 500 \text{ atppm} \qquad 3)$$

When YAG (composition formula: $Y_3Al_5O_{12}$) deviates from the Composition ratio of Y:Al=3:5 with the conditional expression of 1) above, texture of a separate structure such as $Al_2O_3$ or $YAlO_3$ may be precipitated and deteriorate transparency; in which case, laser oscillation may stop in the passive Q-switching. Thus, the Composition of the sintered body needs to satisfy (Y+Ca):(Al+Cr+Mg+Si)=3:5 including Ca to be substituted with "Y atoms" and Cr, Mg, and Si to be substituted with "Al atoms", and even if a compositional deviation occurs, if it is within the range of |(Y+Ca)/(Al+Cr+Si+Mg)−0.6|<0.001, sufficient transparency can be obtained.

The Cr:YAG sintered body according to the embodiment of the present invention is basically tetravalent Cr-substituted YAG, and contains bivalent Ca and Mg for the valence compensation of Cr, and additionally contains Si for improving the sinterability. While Ca works to promote $Cr^{4+}$ conversion, it may cause the sinterability to deteriorate. Moreover, while Mg is able to promote $Cr^{4+}$ conversion albeit weakly, it is unable to sufficiently improve the sinterability. Further, while Si is able to improve the sinterability by being added, it will obstruct $Cr^{4+}$ conversion because Si is tetravalent.

When giving consideration to the function and effect of each additive element, by satisfying the Conditional expression of 2) above, the deterioration of sinterability caused by Ca can be suppressed by adding Si while promoting $Cr^{4+}$ conversion based on Ca and Mg; in addition, the obstruction of $Cr^{4+}$ conversion caused by Si can be suppressed by adding Ca and Mg while improving the sinterability based on Si. Meanwhile, Si exhibits an effect of improving the sinterability by being added in an amount of 50 atppm or more, however, note that the amount of the Si content shall be as per the Conditional expression of 3) above because the sinterability will deteriorate when the additive amount of Si exceeds 500 atppm.

The Cr:YAG sintered body, according to the embodiment of the present invention, includes that the optical transmittance of a wavelength of 1300 nm is preferably 80% or higher. When the transparency is inferior, the laser beam may be obstructed and the laser oscillation stops. There is a relationship between sinterability and transparency. When sintering is sufficiently performed, the number of pores (holes) that remain internally and scatter light will decrease, and a sintered body which exhibits high permeability can be obtained. When transmittance is measured, the thickness of the sintered body is set to be 1 cm because the transmittance will change depending on the thickness.

The Conversion ratio $Cr^{4+}/(Cr^{3+}+Cr^{4+})$ is preferably 0.25 or more according to the embodiment of the present invention. This is because when the Concentration of $Cr^{4+}$ is low, passive Q-switching will not occur and pulse oscillation will not occur, though laser oscillation occurs. The evaluation of valence conversion from $Cr^{3+}$ to $Cr^{4+}$, as is explained in details later, can be performed by comparing with a $Cr^{3+}$:YAG sintered body as a reference sample using an X-ray Absorption Near Edge Structure (XANES).

The method of producing a Cr:YAG sintered body according to the embodiment of the present invention is now explained.

Raw Material Powder

Raw material powders of a $Y_2O_3$ powder, an $Al_2O_3$ powder, a $Cr_2O_3$ powder, a MgO powder, and a $CaCO_3$ powder are prepared and weighed to a prescribed molar ratio. Preferably, the raw material powders have an average grain size of 0.3 to 10 µm; the $Y_2O_3$ powder and the $Al_2O_3$ powder have a purity of 4N or higher; and the $Cr_2O_3$ powder, the MgO powder, and the $CaCO_3$ powder have a purity of 2N or higher.

Mixing

The $Y_2O_3$ powder, $Al_2O_3$ powder, $Cr_2O_3$ powder, MgO powder, and $CaCO_3$ powder are placed in a mixer/pulverizer, and subject to wet mixing for 4 to 6 hours with a ball mill using water as a solvent and alumina as a media. Here, a moderate amount of a dispersing agent is preferably added to suppress mixing non-uniformity caused by the aggregation of the raw material powders. After mixing, $Si(OC_2H_5)_4$ and lactic alumina are added to the slurry, which was removed from the mixer/pulverizer, and agitated. The Si content in the final YAG sintered body can be adjusted based on the additive amount of $Si(OC_2H_5)_4$.

Granulation and Molding

After agitated, the slurry is dried, and forced through a sieve or by spray dry to obtain a granulated powder; and the powder is placed in a mold (φ150 mm×40 mm, for example), subject to cold press, and then to CIP molding at 150 to 200 MPa.

Preliminary Heating

Next, the molded body is heated in an air atmospheric furnace at 100 to 300° C. for 4 to 6 hours to eliminate moisture, and then heated at 800 to 1000° C. for 1 to 3 hours to eliminate organic constituents and the like.

Sintering and Hot Isostatic Pressing (HIP)

Next, the molded body is sintered at 1700 to 1900° C. for 10 to 20 hours. Here, since nitrogen will remain in the sintered body and cause the deterioration in density when sintering is performed in an atmosphere containing nitrogen, it is preferable to perform sintering in a vacuum, reducing atmosphere, or nitrogen-free oxygen atmosphere. Subsequently, the sintered body is subject to HIP in an inert atmosphere such as an Ar atmosphere under the Conditions of 1600 to 1800° C., 1 to 4 hours, and 100 to 200 MPa.

Annealing

The obtained sintered body is heated in an air atmospheric furnace at 1300 to 1500° C. for 5 to 15 hours, whereby the intended Cr:YAG sintered body can be obtained.

The evaluation method of the Cr:YAG sintered body in the embodiment of the present invention is as follows, including the Examples and the Comparative Examples.

Component Composition

The Component composition contained in the sintered body is analyzed based on inductively coupled plasma (ICP) emission spectral analysis or similar methods.

Transparency

The transparency is obtained by analyzing the optical transmittance of a wavelength of 1300 nm which is not absorbed by Cr. If there is no scattering of light in $Cr^{4+}$:YAG, the transmittance at a wavelength of 1300 nm should be around 84%, which includes any loss caused by interface reflection. Thus, when the optical transmittance of a wavelength of 1300 nm is 80% or higher per centimeter of thickness of the sintered body, the transparency is determined to be good.

Evaluating Valence of Cr

The evaluation of valence conversion from $Cr^{3+}$ to $Cr^{4+}$ is performed by comparing a $Cr^{3+}$:YAG sintered body as a reference sample using an X-ray Absorption Near Edge Structure (XANES). While Cr exists in YAG in substitute for "Al atoms" as described above, the Al atoms in YAG adopt a state of eight-coordination in which there are eight oxygen atoms in the periphery, and a state of four-coordination in which there are four oxygen atoms in the periphery. Trivalent Cr is substituted with eight-coordination Al atoms, and tetravalent Cr is substituted with four-coordination Al atoms. When these Cr atoms are irradiated with X-rays having an energy of 5980 to 6040 eV, the K absorption end (transition from 1s trajectory to 4p trajectory) of the Cr atoms is observed. When the area is examined in detail, an independent peak may appear near 5990 eV. This is a peak associated with the transaction from the 1s trajectory to the 3d trajectory; and while this is ordinarily a forbidden transition, it is a transition that is tolerated on grounds of forming a hybrid trajectory of the 3d trajectory and the 4p trajectory based on a crystal field, and is referred to as a pre-edge peak. This peak does not appear in trivalent Cr that exists in the eight-coordination, but appears in tetravalent Cr that exists in the four-coordination. Thus, by measuring the intensity of this peak, the Conversion ratio of tetravalent Cr atoms in YAG ($Cr^{4+}/(Cr^{3+}+Cr^{4+})$) can be evaluated.

Reference Sample $Cr^{3+}$:YAG

A $Y_2O_3$ powder, an $Al_2O_3$ powder, a $Cr_2O_3$ powder, and $Si(OC_2H_5)_4$ were respectively weighed to obtain 34.48 mol %, 62.36 mol %, 0.06 mol %, and 0.10 mol %. By neither adding a MgO powder and a $CaCO_3$ powder nor performing valence compensation, Cr will become trivalent by necessity. Next, in the same manner as Example 1 below, after preparing a slurry from the raw material powders, $Si(OC_2H_5)_4$ and lactic alumina were added to obtain a granulated powder, and the powder was thereafter subject to molding, heating, and calcination to obtain a $Cr^{3+}$:YAG sintered body as a reference sample.

Operation Test of Passive Q-Switching

Figure 3:
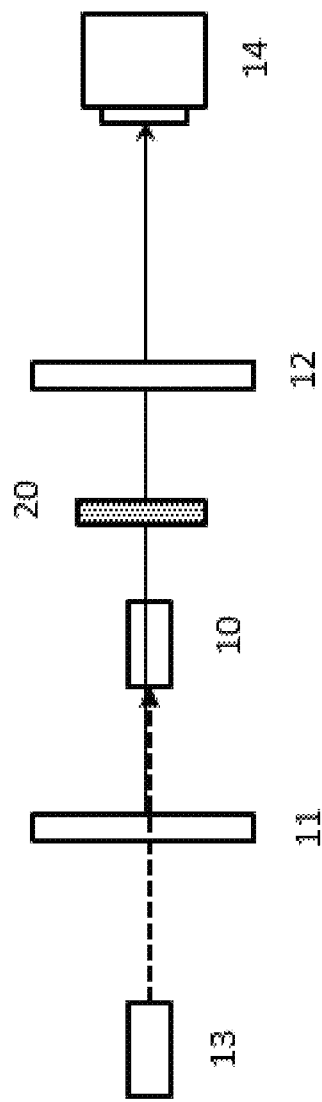
FIG. 3 is a configuration diagram of the laser device for confirming the passive Q-switching function.

The device shown in FIG. 3 was used to perform tests to confirm whether the prepared $Cr^{4+}$:YAG fulfills the function of passive Q-switching. Light from a laser diode 13 which generates a 808 nm laser beam was passed through a dielectric mirror 11 (808 nm light is transmitted 100%, and 1064 nm light is reflected 100%), and caused to enter a 1 at % $Nd:GdVO_4$ crystal 10. The dielectric mirror 11 and a dielectric mirror 12 (1064 nm light is reflected 97%) are placed so as to sandwich the Crystal 10, and a photodetector 14 which detects 1064 nm light is placed therebeyond. Subsequently, emission of 1064 nm light from the Crystal 10 is reflected with the dielectric mirrors 11 and 12 to oscillate laser.

EXAMPLES

The present invention is now explained in detail with reference to the Examples and Comparative Examples. Note that these Examples are merely illustrative, and the present invention shall in no way be limited thereby. In other words, various modifications and other embodiments are covered by the present invention, and the present invention is limited only by the scope of its claims.

Example 1

As raw materials, a $Y_2O_3$ powder, an $Al_2O_3$ powder, a $Cr_2O_3$ powder, a MgO powder, and a $CaCO_3$ powder having an average grain size of 1 μm were respectively weighed to a prescribed amount as shown in Table 1, and the raw material powders were placed in a mixer/pulverizer, and subject to wet mixing for 5 hours with a ball mill using water as a solvent and alumina as a media to obtain a slurry.

$Si(OC_2H_5)_4$ and lactic alumina were added to the slurry, agitated, dried and then a granulated powder having an average particle size of 20 to 30 μm was obtained by spray drying.

The granulated powder was placed in a mold of φ150 mm×40 mm and subject to cold press, and to CIP molding at 176 MPa. Next, the resulting molded body was heated in an air atmospheric furnace at 100° C. for 5 hours, and at 900° C. for 2 hours.

Next, the molded body was calcined in a vacuum heating furnace at 1800° C. for 15 hours, subject to HIP in an Ar atmosphere under the Conditions of 1700° C., 3 hours, and 147 MPa; and thereafter heated in an air atmospheric furnace at 1400° C. for 10 hours to obtain a $Cr^{4+}$:YAG sintered body of φ150 mm×40 mm.

As a result of component analysis on the obtained sintered body, the sintered body satisfied the Conditions of 1) to 3) above, as shown in Table 1. Further, as a result of measuring the optical transmittance of a wavelength of 1300 nm regarding this sintered body exhibited excellent transparency of 84% at a thickness of 1 cm.

Figure 2:
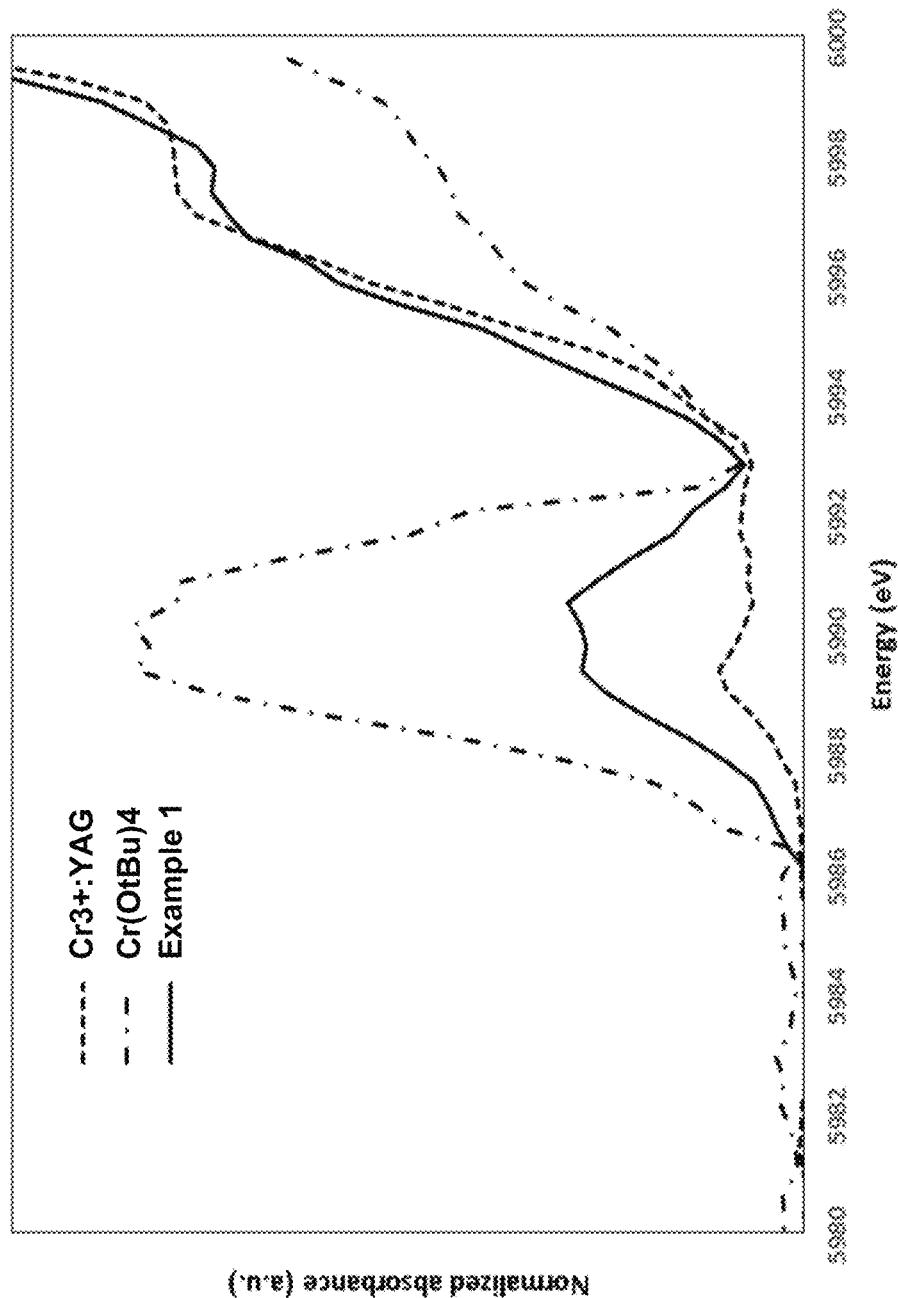
FIG. 2 is an enlarged diagram showing the results near 5990 eV in FIG. 1.

FIG. 1 shows XANES measurement results of the K absorption end regarding the YAG sintered body of Example 1 and $Cr^{3+}$:YAG as a reference sample. As shown in FIG. 1, while a pre-edge peak near 5990 eV appears in Example 1, it did not appear in $Cr^{3+}$:YAG. FIG. 2 is an enlarged diagram showing the results near 5990 eV. FIG. 2 also shows the results of the XANES measurement spectrum of tetra-t-butyl chromate ($Cr(Ot-Bu)_4$) as a crystal configured entirely from tetravalent Cr. Because the peak intensity of the tetra-t-butyl chromate is of a case where the Crystal is configured entirely from tetravalent 4, $Cr^{4+}/(Cr^{3+}+Cr^{4+})$ is obtained based on the peak intensity ratio relative to the foregoing peak intensity of the tetra-t-butyl chromate. The value obtained from this intensity ratio was $Cr^{4+}/(Cr^{3+}+Cr^{4+})=0.29$.

Figure 4:
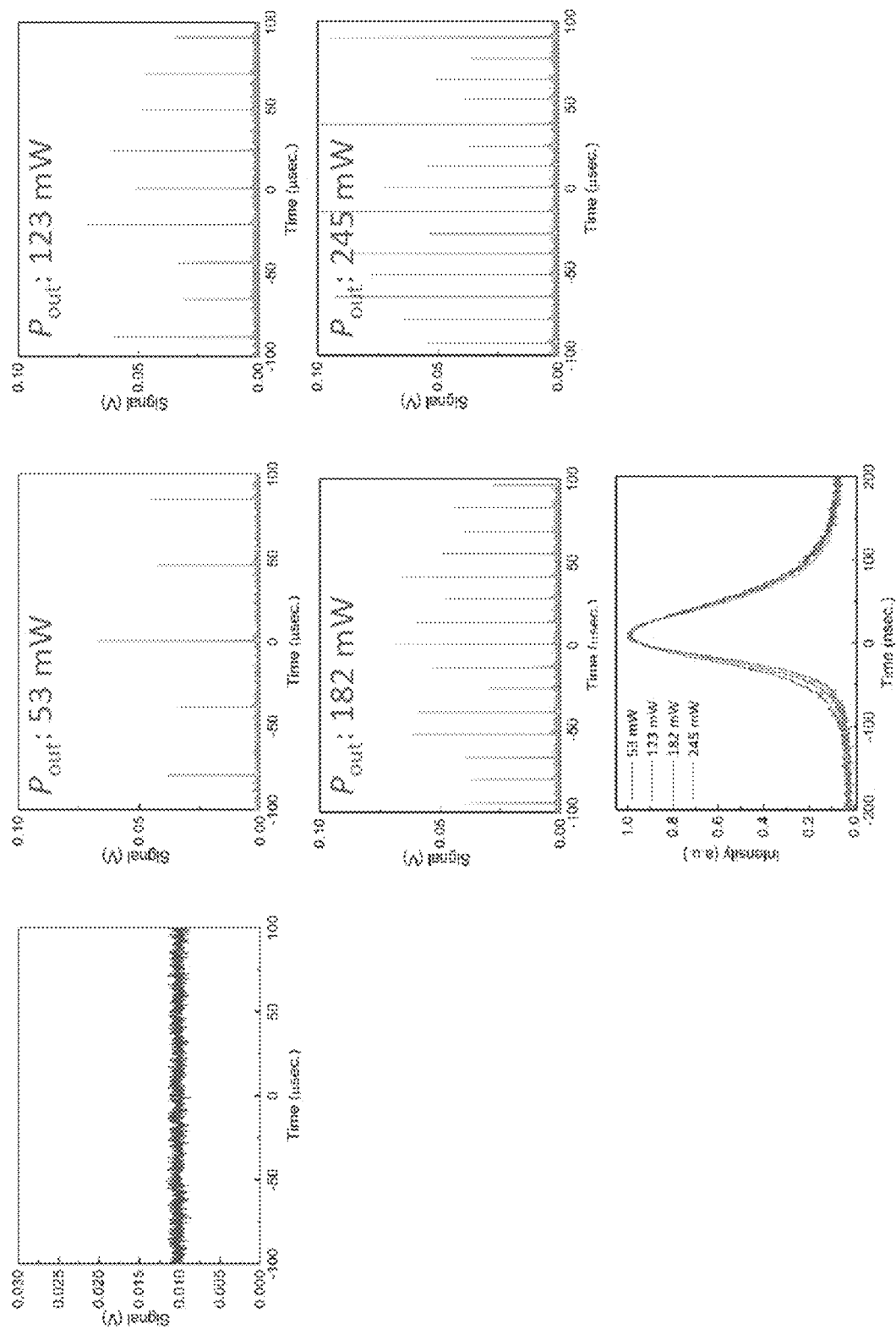
FIG. 4 is a diagram showing the Confirmation result of the passive Q-switching function of Example 1.

Next, in order to confirm whether the prepared Cr:YAG fulfills the function of passive Q-switching, the device shown in FIG. 3 was used to perform tests. The test results are shown in FIG. 4. FIG. 4-(31) shows a state where Cr:YAG 20 has not been inserted, but it can be understood that a certain level of optical intensity signals are being detected irrespective of the time. Meanwhile, FIGS. 4-(32) to 4-(35) show the results of inserting the Cr:YAG 20 prepared in Example 1 between a $Nd:GdVO_4$ crystal 10 and a dielectric mirror 12, changing the excitation light intensity from a laser diode 13, and gradually changing the oscillation output. As shown in FIG. 4, the optical intensity signals become pulsed, and it was observed that the pulse interval becomes narrower as the oscillation output becomes higher, and the occurrence of passive Q-switching based on $Cr^{4+}$:YAG was confirmed. FIG. 4-(36) shows the shape of one pulse in the foregoing case, and the pulse width was roughly 80 ns.

Example 2 to Example 8

Other than changing the weighing ratio of the raw material powders as shown in Table 1, Cr:YAG sintered bodies were prepared in the same method as Example 1. As a result of component analysis on the thus obtained Cr:YAG sintered bodies, the sintered bodies satisfied the Conditions of 1) to 3) above as shown in Table 1. As a result of measuring the optical transmittance of a wavelength of 1300 nm regarding each of these Cr:YAG sintered bodies in the same manner as Example 1, the Cr:YAG sintered bodies respectively exhibited high transparency of 80% or higher at a thickness of 1 cm. Moreover, as a result of evaluating the valence of these Cr:YAG sintered bodies based on XANES in the same manner as Example 1, the Conversion ratio of $Cr^{4+}/(Cr^{3+}+Cr^{4+})$ was, at lowest, 0.25 or more. Further, when the same test as in Example 1 was performed to the respective sintered bodies using the device shown in FIG. 3, pulse oscillation delivered by passive Q-switching was confirmed with each of the sintered bodies.

Comparative Example 1

Other than changing the weighing ratio of the raw material powders as shown in Table 1, a Cr:YAG sintered body was prepared in the same method as Example 1. The result of component analysis on this Cr:YAG sintered body did not satisfy the Condition of 1) above, as shown in Table 1. As a result of measuring the optical transmittance of a wavelength of 1300 nm regarding the Cr:YAG sintered body, the transparency deteriorated to 75% at a thickness of 1 cm. When the same test as in Example 1 was performed to this sintered body using the device shown in FIG. 3, laser oscillation stopped. This is considered to be because the laser beam was obstructed due to the inferior transparency.

Comparative Example 2

Other than changing the weighing ratio of the raw material powders as shown in Table 1, a Cr:YAG sintered body was prepared in the same method as Example 1. The result of component analysis on this Cr:YAG sintered body did not satisfy the Condition of 2) above, as shown in Table 1. The result of evaluating the valence of Cr regarding the Cr:YAG sintered body was $Cr^{4+}/(Cr^{3+}+Cr^{4+})=0.08$. When the same test as in Example 1 was performed to this sintered body using the device shown in FIG. 3, though laser oscillation occurred, pulse oscillation did not occur, and optical signals with a constant intensity were detected irrespective of the time. This is because the Concentration of $Cr^{4+}$ was insufficient to allow passive Q-switching.

Comparative Example 3

Other than changing the weighing ratio of the raw material powders as shown in Table 1 and adding $Si(OC_2H_5)_4$, a Cr:YAG sintered body was prepared in the same method as Example 1. The result of component analysis on this Cr:YAG sintered body did not satisfy the Compositional condition of 3) above, as shown in Table 1. As a result of measuring the optical transmittance of a wavelength of 1300 nm regarding the Cr:YAG sintered body, the transparency deteriorated to 78%. When the same test as in Example 1 was performed to this sintered body using the device shown in FIG. 3, laser oscillation stopped. This is considered to be because the laser beam was obstructed due to the inferior transparency.

Comparative Example 4

Other than changing the weighing ratio of the raw material powders as shown in Table 1, a Cr:YAG sintered body was prepared in the same method as Example 1. The result of component analysis on this Cr:YAG sintered body did not satisfy the Condition of 2) above, as shown in Table 1. The result of evaluating the valence of Cr regarding the Cr:YAG sintered body was $Cr^{4+}/(Cr^{3+}+Cr^{4+})=0.01$. When the same test as in Example 1 was performed to this sintered body using the device shown in FIG. 3, though laser oscillation occurred, pulse oscillation did not occur, and optical signals with a constant intensity were detected irrespective of the time. This is because the Concentration of $Cr^{4+}$ was insufficient to allow passive Q-switching.

Comparative Example 5

Other than changing the weighing ratio of the raw material powders as shown in Table 1, a Cr:YAG sintered body was prepared in the same method as Example 1. The result of component analysis on this Cr:YAG sintered body did not satisfy the Condition of 2) above, as shown in Table 1. The result of evaluating the valence of Cr regarding the Cr:YAG sintered body was $Cr^{4+}/(Cr^{3+}+Cr^{4+})=0.01$. When the same test as in Example 1 was performed to this sintered body using the device shown in FIG. 3, though laser oscillation occurred, pulse oscillation did not occur, and optical signals with a constant intensity were detected irrespective of the time. This is because the Concentration of $Cr^{4+}$ was insufficient to allow passive Q-switching.

Comparative Example 6

Other than changing the weighing ratio of the raw material powders as shown in Table 1, a Cr:YAG sintered body was prepared in the same method as Example 1. The result of component analysis on this Cr:YAG sintered body did not satisfy the Condition of 2) above, as shown in Table 1. The result of evaluating the valence of Cr regarding the Cr:YAG sintered body was $Cr^{4+}/(Cr^{3+}+Cr^{4+})=0.10$. When the same test as in Example 1 was performed to this sintered body using the device shown in FIG. 3, though laser oscillation occurred, pulse oscillation did not occur, and optical signals with a constant intensity were detected irrespective of the time. This is because the Concentration of $Cr^{4+}$ was insufficient to allow passive Q-switching.

Comparative Example 7

Other than changing the weighing ratio of the raw material powders as shown in Table 1, a Cr:YAG sintered body was prepared in the same method as Example 1. The result of component analysis on this Cr:YAG sintered body did not satisfy the Conditions of 1) and 2) above, as shown in Table 1. As a result of measuring the optical transmittance of a wavelength of 1300 nm regarding the Cr:YAG sintered body, the transparency deteriorated to 60% at a thickness of 1 cm. When the same test as in Example 1 was performed to this sintered body using the device shown in FIG. 3, laser oscillation stopped. This is considered to be because the laser beam was obstructed due to the inferior transparency.

Comparative Example 8

Other than changing the weighing ratio of the raw material powders as shown in Table 1, a Cr:YAG sintered body was prepared in the same method as Example 1. The result of component analysis on this Cr:YAG sintered body did not satisfy the Condition of 2) above, as shown in Table 1. The result of evaluating the valence of Cr regarding the Cr:YAG sintered body was $Cr^{4+}/(Cr^{3+}+Cr^{4+})=0.31$. When the same test as in Example 1 was performed to this sintered body using the device shown in FIG. 3, though laser oscillation occurred, pulse oscillation did not occur, and optical signals with a constant intensity were detected irrespective of the time. This is because the Concentration of $Cr^{4+}$ was insufficient to allow passive Q-switching.

TABLE 1

| | Material Powder (mol %) | | | | | Sintering Aid | YAG Sintered Body (atppm) | |
|---|---|---|---|---|---|---|---|---|
| | $Y_2O_3$ | $Al_2O_3$ | $Cr_2O_3$ | MgO | $CaCO_3$ | $Si(OC_2H_5)_4$ | $\lvert(Y+Ca)/(Al+Cr+Si+Mg)-0.6\rvert$ | $((Ca+Mg)-(Cr+Si))/(Y+Ca+Al+Cr+Si+Mg+O)$ |
| Example 1 | 37.42% | 62.27% | 0.06% | 0.06% | 0.12% | 0.06% | 0.0008 | 0 |
| Example 2 | 37.36% | 62.31% | 0.06% | 0.06% | 0.14% | 0.06% | 0.0005 | 25 |
| Example 3 | 37.32% | 62.27% | 0.06% | 0.00% | 0.25% | 0.10% | 0.0002 | 50 |
| Example 4 | 37.44% | 62.13% | 0.06% | 0.25% | 0.00% | 0.12% | 0.0002 | 0 |
| Example 5 | 37.38% | 62.18% | 0.06% | 0.12% | 0.12% | 0.12% | 0.0004 | 25 |
| Example 6 | 37.26% | 62.04% | 0.06% | 0.14% | 0.25% | 0.25% | 0.0002 | 0 |
| Example 7 | 37.29% | 62.08% | 0.12% | 0.14% | 0.25% | 0.12% | 0.0002 | 25 |
| Example 8 | 37.39% | 62.35% | 0.06% | 0.05% | 0.12% | 0.02% | 0.0002 | 50 |
| Comparative Example 1 | 37.29% | 62.38% | 0.06% | 0.06% | 0.14% | 0.06% | 0.0020 | 25 |
| Comparative Example 2 | 37.36% | 62.27% | 0.06% | 0.06% | 0.12% | 0.12% | 0.0006 | −125 |
| Comparative Example 3 | 37.38% | 62.37% | 0.06% | 0.06% | 0.12% | 0.00% | 0.0006 | 125 |
| Comparative Example 4 | 37.47% | 62.38% | 0.06% | 0.01% | 0.01% | 0.06% | 0.0003 | −325 |
| Comparative Example 5 | 37.45% | 62.35% | 0.06% | 0.06% | 0.01% | 0.06% | 0.0005 | −225 |
| Comparative Example 6 | 37.43% | 62.31% | 0.06% | 0.01% | 0.12% | 0.06% | 0.0006 | −100 |
| Comparative Example 7 | 37.20% | 61.93% | 0.06% | 0.62% | 0.12% | 0.06% | 0.0023 | 1118 |
| Comparative Example 8 | 37.24% | 62.01% | 0.06% | 0.00% | 0.62% | 0.06% | 0.0047 | 870 |

| | YAG Sintered Body (atppm) | Transparency Transmittance of Light having | $Cr^{4+}$ Conversion ratio | Characteristics | |
|---|---|---|---|---|---|
| | $Si/(Y+Ca+Al+Cr+Si+Mg+O)$ | Wavelength of 1300 nm (%) | $Cr^{4+}/(Cr^{3+}+Cr^{4+})$ | Laser Oscillation | Q-switching |
| Example 1 | 125 | 84 | 0.29 | occurred | occurred |
| Example 2 | 125 | 84 | 0.32 | occurred | occurred |
| Example 3 | 200 | 84 | 0.32 | occurred | occurred |
| Example 4 | 250 | 84 | 0.25 | occurred | occurred |
| Example 5 | 250 | 84 | 0.31 | occurred | occurred |
| Example 6 | 250 | 84 | 0.29 | occurred | occurred |
| Example 7 | 250 | 84 | 0.30 | occurred | occurred |
| Example 8 | 50 | 83 | 0.28 | occurred | occurred |
| Comparative Example 1 | 125 | 75 | 0.31 | not occurred | — |
| Comparative Example 2 | 250 | 84 | 0.08 | occurred | not occurred |
| Comparative Example 3 | 0 | 78 | 0.28 | not occurred | — |
| Comparative Example 4 | 125 | 84 | 0.01 | occurred | not occurred |
| Comparative Example 5 | 125 | 84 | 0.01 | occurred | not occurred |
| Comparative Example 6 | 125 | 84 | 0.10 | occurred | not occurred |
| Comparative Example 7 | 124 | 60 | 0.30 | not occurred | not occurred |
| Comparative Example 8 | 124 | 40 | 0.31 | not occurred | not occurred |

According to the present invention, it is possible to produce a Cr:YAG sintered body which exhibits high transparency and has a high $Cr^{4+}$ conversion ratio. The Cr:YAG sintered body according to the embodiment of the present invention is used for creating phosphors and laser mediums.

DESCRIPTION OF REFERENCE NUMERALS

10: 1 at % $Nd:GdVO_4$ crystals
11: dielectric mirror
12: dielectric mirror
13: laser diode
14: photodetector
20: Cr:YAG sintered body

The invention claimed is:

1. A Cr:YAG sintered body, comprising:
Al, Y, Cr, Ca, Mg, Si, and O;
component contents in the sintered body satisfying conditional expressions of 1) to 3) below;
in the Conditional expression, each chemical symbol representing a component content (atppm);

$$|(Y+Ca)/(Al+Cr+Si+Mg)-0.6|<0.001; \qquad 1)$$

$$0 \leq (Ca+Mg)-(Cr+Si) \leq 50 \text{ atppm; and} \qquad 2)$$

$$50 \leq Si \leq 500 \text{ atppm} \qquad 3).$$

2. The Cr:YAG sintered body according to claim 1, wherein optical transmittance of a wavelength of 1300 nm is 80% or higher.

3. The Cr:YAG sintered body according to claim 2, wherein a conversion ratio of $Cr^{4+}$ is $Cr^{4+}/(Cr^{3+}+Cr^{4+}) \geq 0.25$.

4. The Cr:YAG sintered body according to claim 1, wherein a conversion ratio of $Cr^{4+}$ is $Cr^{4+}/(Cr^{3+}+Cr^{4+}) \geq 0.25$.

* * * * *